US012785212B2

(12) United States Patent
Mita

(10) Patent No.: US 12,785,212 B2
(45) Date of Patent: Nov. 3, 2026

(54) BATTERY

(71) Applicant: MURATA MANUFACTURING CO., LTD., Kyoto (JP)

(72) Inventor: Hiroki Mita, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 772 days.

(21) Appl. No.: 18/127,761

(22) Filed: Mar. 29, 2023

(65) Prior Publication Data

US 2023/0261317 A1 Aug. 17, 2023

Related U.S. Application Data

(63) Continuation of application No. PCT/JP2021/034047, filed on Sep. 16, 2021.

(30) Foreign Application Priority Data

Nov. 24, 2020 (JP) ................................ 2020-194348

(51) Int. Cl.
*H01M 50/431* (2021.01)
*H01M 10/0567* (2010.01)
*H01M 50/117* (2021.01)

(52) U.S. Cl.
CPC ..... *H01M 50/431* (2021.01); *H01M 10/0567* (2013.01); *H01M 50/117* (2021.01)

(58) Field of Classification Search
CPC ............ H01M 50/431; H01M 50/117; H01M 10/0567
See application file for complete search history.

(56) References Cited

U.S. PATENT DOCUMENTS 6,503,661 B1 * 1/2003 Park .................. H01M 10/0565 429/304
7,285,334 B1 * 10/2007 Yamashita .......... H01M 50/122 428/458
2004/0015028 A1 * 1/2004 Brown .................. C10G 50/00 585/533

(Continued)

FOREIGN PATENT DOCUMENTS

JP 2005174655 A 6/2005
JP 2015118879 A 6/2015

(Continued)

OTHER PUBLICATIONS

Machine Translation of KR-20110023438-A (Apr. 10, 2026) (Year: 2026).*

(Continued)

*Primary Examiner* — Matthew J Merkling
(74) *Attorney, Agent, or Firm* — K&L Gates LLP

(57) ABSTRACT

Provided is a battery that has a high capacity retention ratio and has a shape that is not swollen, if the battery is repeatedly charged and discharged. Provided is a battery including: an electrode body where a positive electrode and a negative electrode are alternately stacked with a separator provided therebetween and wound in a flattened shape; an electrolyte; and an exterior material, where at least one of the electrolyte, the separator, or the exterior material includes a filler, and the filler includes a zeolite having no Si as a constituent element.

6 Claims, 3 Drawing Sheets

(56) References Cited

U.S. PATENT DOCUMENTS

| | | | | |
|---|---|---|---|---|
| 2009/0104538 | A1 | 4/2009 | Wakihara et al. | |
| 2012/0049108 | A1* | 3/2012 | He | H01M 4/667 252/182.1 |
| 2014/0023930 | A1* | 1/2014 | Shin | H01M 50/446 429/246 |
| 2016/0043370 | A1* | 2/2016 | Hatta | H01M 50/451 180/65.23 |
| 2018/0043656 | A1* | 2/2018 | Song | H01M 50/491 |
| 2022/0109148 | A1 | 4/2022 | Osawa et al. | |

FOREIGN PATENT DOCUMENTS

| | | | | |
|---|---|---|---|---|
| JP | 2015216089 | A | 12/2015 | |
| JP | 2020113465 | A | 7/2020 | |
| KR | 20110023438 | A * | 3/2011 | H01M 50/121 |
| WO | 2006132339 | A1 | 12/2006 | |

OTHER PUBLICATIONS

International Search Report of corresponding PCT application PCT/JP2021/034047, dated Oct. 26, 2021.

* cited by examiner

BATTERY

CROSS REFERENCE TO RELATED APPLICATIONS

The present application is a continuation of PCT patent application no. PCT/JP2021/034047, filed on Sep. 16, 2021, which claims priority to Japanese patent application no. JP2020-194348, filed on Nov. 24, 2020, the entire contents of which are incorporated herein by reference.

BACKGROUND

The present application relates to a battery.

For lithium ion batteries and the like, zeolites have been mixed and then used in the batteries for improving battery performance.

A technique has been described disposing carbon on the surface of a zeolite made of an aluminum silicate to impart excellent electrical characteristics and lifetime characteristics to a battery.

SUMMARY

The present application relates to a battery.

The technique identified in the Background is a technique of adsorbing gas generated in a battery onto a zeolite made of an aluminum silicate. When a lithium hexafluorophosphate ($LiPF_6$) is used for an electrolyte salt, however, the $LiPF_6$ may react with moisture ($H_2O$) contained in an electrolytic solution, thereby generating, for example, hydrogen fluoride (HF), and while charge-discharge is repeated, the HF and the Si of the aluminum silicate may potentially react chemically, thereby destroying the zeolite. Because $H_2O$ is generated in the process of breaking the zeolite, the zeolite may be potentially further broken by the progress of a chemical reaction: the $H_2O$ reacts with $LiPF_6$, thereby generating HF, and then breaking the zeolite again. When the zeolite is broken, the zeolite fails to successfully adsorb gas generated in the battery, thus resulting in problematically swelling the shape of the battery and decreasing the capacity retention ratio.

The present application relates to providing a battery that has a high capacity retention ratio and has a shape that is not swollen, if the battery is repeatedly charged and discharged according to an embodiment.

For solving the problem described above, the present application, in an embodiment, provides a battery including: an electrode body including a positive electrode and a negative electrode stacked with a separator interposed therebetween; an electrolyte; and an exterior material, where at least one of the electrolyte, the separator, or the exterior material includes a filler, and the filler includes a zeolite containing no Si as a constituent element.

According to an embodiment, a battery including an aluminophosphate-type zeolite as a filler can be provided, and if the battery is repeatedly charged and discharged, the battery has a high capacity retention ratio, and can be prevented from being deformed due to swelling. It is to be noted that the effects of the present application are not limited to the effects described herein, and may relate to other suitable effects.

DETAILED DESCRIPTION

The present application relates to a battery and will be described below in further detail including with reference to the figures according to an embodiment.

In an embodiment, fillers disposed in batteries will be described including with reference to the first to third battery examples.

Figure 1:
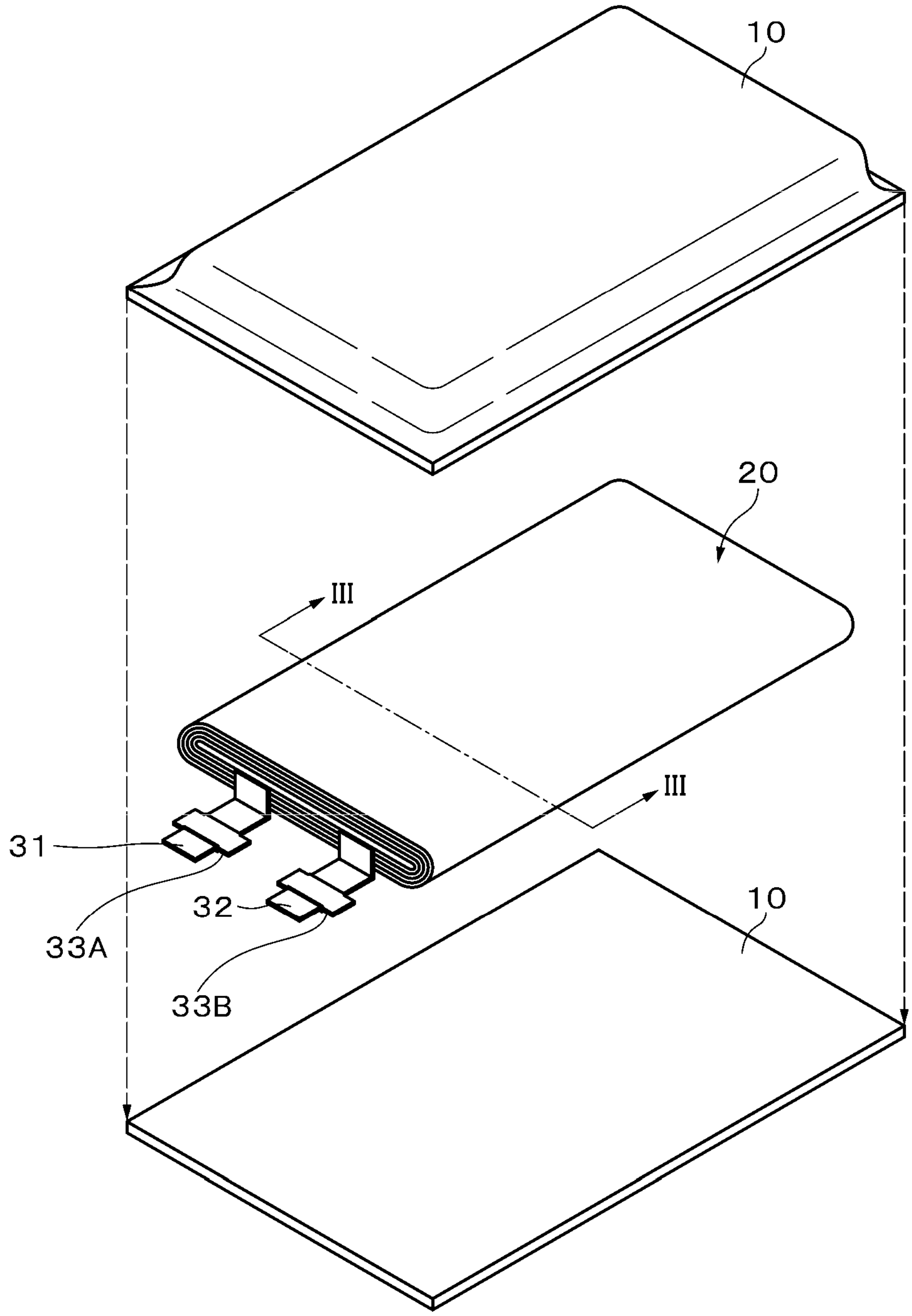
FIG. 1 is an exploded perspective view illustrating an example of the configuration of a non-aqueous electrolyte secondary battery according to a first battery example.

FIG. 1 shows an example of the configuration of a non-aqueous electrolyte secondary battery (hereinafter, referred to simply as "battery") according to the first battery example. The battery, which is a so-called laminate-type battery, includes: a wound-type electrode body 20 that has a flattened shape, with a positive electrode lead 31 and a negative electrode lead 32 attached thereto; and a film-shaped exterior material 10 that houses this electrode body 20, and the battery can be reduced in size, weight, and thickness.

The positive electrode lead 31 and the negative electrode lead 32 are each led out from the inside of the exterior material 10 toward the outside, for example, in the same direction. The positive electrode lead 31 and the negative electrode lead 32 have, for example, a thin plate shape or a mesh shape. The positive electrode lead 31 and the negative electrode lead 32 are made of, for example, a metal material such as Al, Cu, Ni, or stainless steel.

Close contact films 33A and 33B for preventing the intrusion of outside air are inserted respectively between the exterior material 30 and the positive electrode lead 31 and between the exterior material 30 and the negative electrode lead 32. The close contact films 33A, 33B are made of a material that has close contact to the positive electrode lead 31 and the negative electrode lead 32, for example, a polyolefin resin such as a polyethylene, a polypropylene, a modified polyethylene, or a modified polypropylene.

Figure 2:
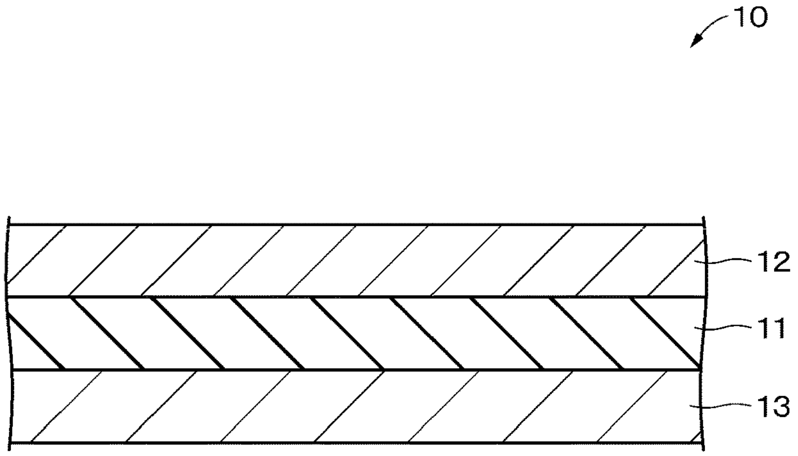
FIG. 2 is a sectional view showing an example of the configuration of an exterior material.

FIG. 2 shows an example of the configuration of the exterior material 10. The exterior material 10 is made of, for example, a rectangular laminate film with flexibility. The exterior material 10 includes a metal layer 11, a resin layer (first resin layer) 12 provided on one surface (first surface) of the metal layer 11, and a resin layer (second resin layer) 13 provided on the other surface (second surface) of the metal layer 11. The exterior material 10 may further include an adhesive layer on at least one of between the metal layer 11 and the resin layer 12 and between the metal layer 11 and the resin layer 13, if necessary. It is to be noted that, of both surfaces of the exterior material 10, the surface on the side with the resin layer 12 serves as an outer surface, whereas the surface on the side with the resin layer 13 serves as an inner surface for housing the electrode body 20.

The metal layer 11 is a barrier layer that plays a role for preventing the ingress of moisture and the like and protecting the electrode body 20, which is an object to be housed. The metal layer 11, which is a metal foil, contains, for example, aluminum or an aluminum alloy.

The resin layer 12 is a surface protection layer that has the function of protecting the surface of the exterior material 10. The resin layer 12 contains, for example, at least one selected from the group consisting of a nylon (Ny), a polyethylene terephthalate (PET), and a polyethylene naphthalate (PEN).

The resin layer 13 is a heat-sealing resin layer for sealing the edges of the inner surface of the folded exterior material 10 by heat-sealing. The resin layer 13 contains, for example, at least one selected from the group consisting of a polypropylene (PP) and a polyethylene (PE).

It is to be noted that the exterior material 10 may be made of a laminate film that has another structure, a polymer film such as a polypropylene, or a metal film, instead of the above-described laminate film. Alternatively, the exterior material 10 may be composed of a laminate film that has a polymer film laminated on one or both surfaces of an aluminum film as a core material.

In addition, the exterior material 10 may, from viewpoints such as beauty of the appearance, further include a colored layer, or include a coloring material in at least one of the resin layers 12, 13. When the exterior material 10 further includes an adhesive layer at least one of between the metal layer 11 and the resin layer 12 and between the metal layer 11 and the resin layer 13, the adhesive layer may include a coloring material.

Figure 3:
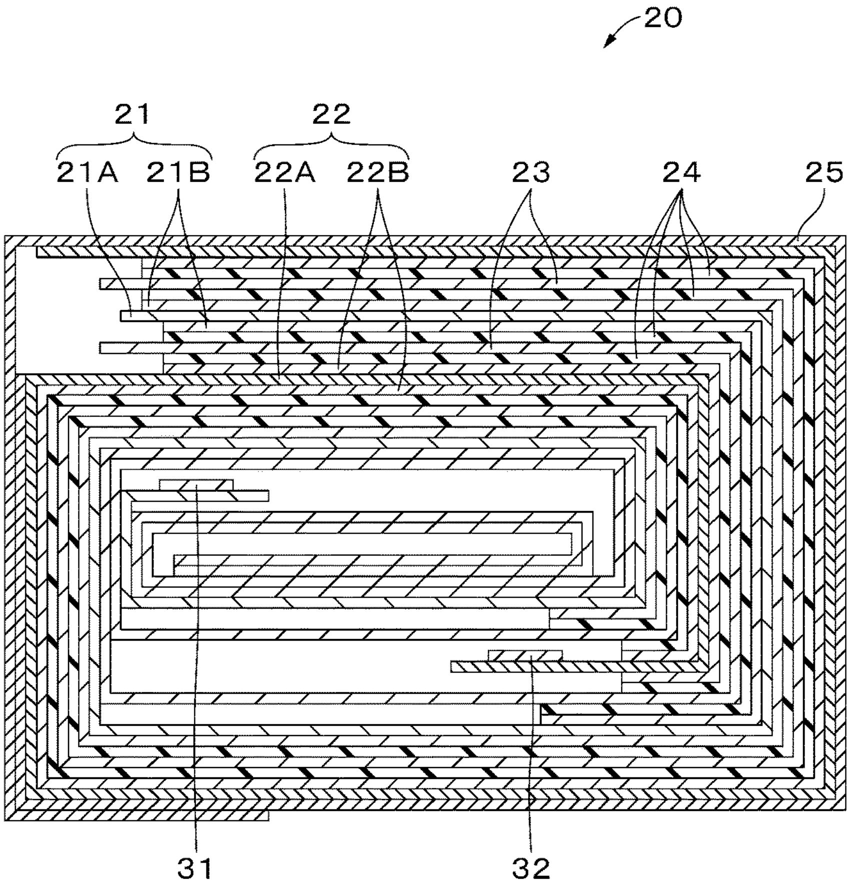
FIG. 3 is a sectional view taken along line III-III in FIG. 1.

FIG. 3 is a sectional view of the electrode body 20 illustrated in FIG. 1, taken along the line III-III. The electrode body 20 includes a positive electrode 21 that has an elongated shape, a negative electrode 22 that has an elongated shape, a separator 23 that has an elongated shape, provided between the positive electrode 21 and the negative electrode 22, and an electrolyte layer 24 provided between the positive electrode 21 and the separator 23 and between the negative electrode 22 and the separator 23. The electrode body 20 has a configuration where the positive electrode 21 and the negative electrode 22 are stacked with the separator 23 and an electrolyte layer 24 interposed therebetween and wound in the longitudinal direction so as to have a flattened and spiral shape, and the outermost periphery is protected with a protective tape 25.

Hereinafter, the positive electrode 21, negative electrode 22, separator 23, and electrolyte layer 24 constituting the battery will be sequentially described.

The positive electrode 21 includes, for example, a positive electrode current collector 21A and a positive electrode active material layer 21B provided on both surfaces of the positive electrode current collector 21A. The positive electrode current collector 21A is made of, for example, a metal foil such as an aluminum foil, a nickel foil, or a stainless-steel foil. The positive electrode active material layer 21B includes one type of, or two or more types of positive electrode active materials capable of occluding and releasing lithium. The positive electrode active material layer 21B may further include at least one of a binder and a conductive agent, if necessary.

As the positive electrode active material, for example, a lithium-containing compound such as a lithium oxide, a lithium phosphorus oxide, a lithium sulfide, or an intercalation compound containing lithium is suitable, and two or more thereof may be used in mixture. In order to increase the energy density, a lithium-containing compound containing lithium, a transition metal element, and oxygen is preferred. Examples of such a lithium-containing compound include a lithium composite oxide that has a layered rock-salt-type structure, and a lithium composite phosphate that has an olivine-type structure. The lithium-containing compound more preferably contains, as a transition metal element, at least one selected from the group consisting of Co, Ni, Mn, and Fe. Examples of such a lithium-containing compound include: a lithium composite oxide that has a layered rock-salt-type structure; a lithium composite oxide that has a spinel-type structure; or a lithium composite phosphate that has an olivine-type structure, and specifically include $LiNi_{0.50}Co_{0.20}Mn_{0.30}O_2$, $LiCoO_2$, $LiNiO_2$, $LiNi_aCo_{1-a}O_2$ ($0<a<1$), $LiMn_2O_4$, or $LiFePO_4$, and additionally, known lithium-containing compounds are available.

In addition to these compounds, inorganic compounds containing no lithium, such as $MnO_2$, $V_2O_5$, $V_6O_{13}$, NiS, and MoS, can also be used as the positive electrode active material capable of occluding and releasing lithium.

The positive electrode active material capable of occluding and releasing lithium may be other than those described above. Further, two or more of the positive electrode active materials exemplified above may be mixed in any combination.

For example, at least one selected from the group consisting of a polyvinylidene difluoride, a polytetrafluoroethylene, a polyacrylonitrile, a styrene butadiene rubber, a carboxymethyl cellulose, copolymers mainly containing one of these resin materials, and the like can be used as the binder.

For example, at least one carbon material selected from the group consisting of graphite, carbon fibers, carbon black, acetylene black, Ketjen black, carbon nanotubes, graphene, and the like can be used as the conductive agent. It is to be noted that the conductive agent may be any material with conductivity, and is not to be considered limited to any carbon material. For example, a metal material, a conductive polymer material, or the like may be used as the conductive agent. In addition, examples of the shape of the conductive agent include, but not particularly limited to, a granular shape, a scaly shape, a hollow shape, a needle shape, or a cylindrical shape.

The negative electrode 22 includes, for example, a negative electrode current collector 22A and a negative electrode active material layer 22B provided on both surfaces of the negative electrode current collector 22A. The negative electrode current collector 22A is made of, for example, a metal foil such as a copper foil, a nickel foil, or a stainless-steel foil. The negative electrode active material layer 22B includes one type of, or two or more types of negative electrode active materials capable of occluding and releasing lithium. The negative electrode active material layer 22B may further include at least one of a binder and a conductive agent, if necessary.

Further, in this battery, preferably, the electrochemical equivalent of the negative electrode 22 or negative electrode active material is greater than the electrochemical equivalent of the positive electrode 21, and theoretically, lithium metal is not deposited on the negative electrode 22 in the course of charge.

Examples of the negative electrode active material include carbon materials such as non-graphitizable carbon, graphitizable carbon, graphite, pyrolytic carbons, cokes, glassy carbons, fired bodies of organic polymer compounds, carbon fibers, and activated carbon. Among these materials, examples of the cokes include pitch coke, needle coke, and petroleum coke. The fired body of organic polymer compound refers to a carbonized product obtained by firing a polymer material such as a phenol resin or a furan resin at an appropriate temperature, and some fired bodies of organic polymer compounds are classified as non-graphitizable carbon or graphitizable carbon. These carbon materials are preferred, because the crystal structures are very unlikely to be changed in the case of charge-discharge, thereby allowing a high charge-discharge capacity to be obtained as well as favorable cycle characteristics. In particular, graphite is preferred, because of its great electrochemical equivalent, which allows for the achievement of a high energy density. In addition, non-graphitizable carbon is preferred, because excellent cycle characteristics are achieved. Furthermore, materials that are low in charge-discharge potential, specifically materials that are close in charge-discharge potential to lithium metal are preferred, because the increased energy density of the battery can be easily achieved.

In addition, examples of other negative electrode active materials capable of increasing the capacity include materials containing, as a constituent element, at least one of metal elements and metalloid elements (for example, an alloy, a compound, or a mixture). This is because the use of such a material can achieve a high energy density. In particular, the use of such a material in combination with a carbon material is more preferred, because a high energy density can be obtained as well as excellent cycle characteristics. It is to be noted that in the present application, the alloy encompasses an alloy containing one or more metal elements and one or more metalloid elements in addition to an alloy composed of two or more metal elements. In addition, the alloy may contain a nonmetallic element. The structure encompasses a solid solution, a eutectic (eutectic mixture), an intermetallic compound, or two or more thereof in coexistence.

Examples of such a negative electrode active material include a material containing, as a constituent element, a metal element or a metalloid element of Group 4B in the short periodic table, and preferred among the examples are materials containing Si as a constituent element. This is because Si has a high ability to occlude and release lithium, thereby allowing a high energy density to be obtained. Examples of such a negative electrode active material include: a simple substance, an alloy, or a compound of Si; and a material including one, or two or more thereof in at least a part of the material. Examples of the compound of Si include $SiO_x$ ($x \geq 0$), and include a material in which particles have therein a mix of the compound and a carbon material.

Examples of other negative electrode active materials include metal oxides or polymer compounds capable of occluding and releasing lithium. Examples of the metal oxides include a lithium titanium oxide including Li and Ti, such as lithium titanate ($Li_4Ti_5O_{12}$), an iron oxide, a ruthenium oxide, and a molybdenum oxide. Examples of the polymer compound include a polyacetylene, a polyaniline, and a polypyrrole.

The same binder as that for the positive electrode active material layer 21B can be used as the binder.

The same conductive agent as that for the positive electrode active material layer 21B can be used as the conductive agent.

The separator 23 is an insulating porous membrane that separates the positive electrode 21 and the negative electrode 22, prevents a short circuit due to contact between both electrodes each other, and allows permeation of lithium ions. The electrolyte is held in the pores of the separator 23, and thus, the separator 23 preferably has characteristics of high resistance to the electrolyte, low reactivity, and less expansion.

The separator 23 is composed of, for example, a porous membrane made of a polytetrafluoroethylene, a polyolefin resin (for example, a polypropylene (PP) or a polyethylene (PE)), an acrylic resin, a styrene resin, a polyester resin, a nylon resin, or a resin obtained by blending these resins, and may have a structure obtained by laminating two or more thereof.

Above all, a porous membrane made of a polyolefin is preferred, because of having a great effect on short circuit prevention and allowing for improving the safety of the battery by the shutdown effect. In particular, polyethylenes are capable of achieving a shutdown effect within a range of 100° C. or higher and 160° C. or lower and also excellent in electrochemical stability, and are thus preferred as a material constituting the separator 23. Among the polyethylenes, low-density polyethylenes, high-density polyethylenes, and linear polyethylenes are suitably used, because of having appropriate melting temperatures and being easily available. In addition, a material obtained by copolymerizing or blending a resin with chemical stability with a polyethylene or a polypropylene can be used. Alternatively, the porous membrane may have a structure of three or more layers: a polypropylene layer, a polyethylene layer, and a polypropylene layer sequentially laminated. The method for producing the separator 23 may be wet or dry.

As the separator 23, nonwoven fabrics may be used. As the fibers constituting the nonwoven fabrics, aramid fibers, glass fibers, polyolefin fibers, polyethylene terephthalate (PET) fibers, nylon fibers, and the like can be used. In addition, two or more of these fibers may be mixed for a nonwoven fabric.

The electrolyte layer 24 includes an electrolytic solution, a polymer compound, and a filler, and the electrolytic solution and the filler are in contact with each other in the electrolyte layer 24. As described later, the present application is applied to the filler. The electrolyte layer 24 preferably has the form of a gel. The electrolyte layer 24 has the form of a gel, thereby allowing a high ion conductivity to be obtained and allowing liquid leakage from the battery to be prevented.

The electrolytic solution, which is a so-called non-aqueous electrolytic solution, includes an organic solvent (non-aqueous solvent) and an electrolyte salt dissolved in the organic solvent. The electrolytic solution may include a known additive to improve battery characteristics.

As the organic solvent, cyclic carbonic acid esters such as an ethylene carbonate and a propylene carbonate can be used, and one of an ethylene carbonate and a propylene carbonate, particularly both thereof are preferably used in mixture. This is because cycle characteristics can be further improved.

In addition to these cyclic carbonic acid esters, a chain carbonic acid ester such as a diethyl carbonate, a dimethyl carbonate, an ethyl methyl carbonate, or a methyl propyl carbonate is preferably used in mixture as the organic solvent. This is because a high ion conductivity can be obtained.

It is to be noted that compounds obtained by substituting at least some hydrogen of these organic solvents with fluorine may be preferred because the reversibility of the electrode reactions may be improved depending on the types of the electrodes to be combined.

Examples of the electrolyte salt include lithium salts, and one of the salts may be used singly, or two or more thereof may be used in combination. Examples of the lithium salts include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bisoxalate borate, and LiBr. Among these salts, $LiPF_6$ is preferred because of allowing a high ion conductivity to be obtained and allowing cycle characteristics to be further improved.

The polymer compound is a holder that holds the electrolytic solution, and is swollen by the electrolytic solution. Examples of the polymer compound include a polyacrylonitrile, a polyvinylidene fluoride, a copolymer of a vinylidene fluoride and a hexafluoropropylene, a polytetrafluoroethylene, a polyhexafluoropropylene, a polyethylene oxide, a polypropylene oxide, a polyphosphazene, a polysiloxane, a polyvinyl acetate, a polyvinyl alcohol, a polymethyl methacrylate, a polyacrylic acid, a polymethacrylic acid, a styrene-butadiene rubber, a nitrile-butadiene rubber, a polystyrene, or a polycarbonate. In particular, from the viewpoint of electrochemical stability, a polyacrylonitrile, a polyvinylidene fluoride, a polyhexafluoropropylene, or a polyethylene oxide is preferred.

The filler has a zeolite containing Si and a zeolite containing no Si. The zeolite containing Si is, for example, an aluminosilicate, and for example, a zeolite that has a composition represented by the following composition formula is used.

$$(M1,M2_{1/2})_m(Al_mSi_nO_{2(m+n)})\cdot xH_2O$$

M1 is a monovalent cation such as $Li^+$, $Na^+$, or $K^+$, and M2 is a divalent cation such as $Ca^{2+}$, $Mg^{2+}$, or $Ba^{2+}$.

The zeolite containing no Si is, for example, an aluminophosphate. The aluminophosphate is also referred to as an aluminophosphate-type zeolite or an AlPO-type zeolite, and the composition formula can be written as $AlPO_4$.

As the zeolite, for example, at least one selected from the group consisting of a type A zeolite (LTA), a type X zeolite (FAU), a type Y zeolite (FAU), a beta-type zeolite (BEA), AlPO-5 (AFI), and the like can be used.

The concentration of the filler may be different between in the electrolyte layer 24 provided between the positive electrode 21 and the separator 23 and in the electrolyte layer 24 provided between the negative electrode 22 and the separator 23. The concentration of the filler in the electrolyte layer 24 provided between the positive electrode 21 and the separator 23 is preferably higher than the concentration of the filler in the electrolyte layer 24 provided between the negative electrode 22 and the separator 23, in consideration of the fact that when the battery is charged at a higher voltage, the electrolytic solution is decomposed on the side with positive electrode 21 at the time of the charge, thereby making gas likely to be generated.

The shape of the filler is not particularly limited, and any of spherical, plate, fibrous, cubic, and random shapes can be used.

The filler preferably falls within the range of 10 μm or less in particle size. If the particle size exceeds 10 μm, the distance between the electrodes is increased, thereby failing to obtain a sufficient filling amount of active material in the limited space, and thus decreasing the battery capacity.

The positive electrode potential in the fully charged state is preferably greater than 4.20 V (vs. $Li/Li^+$), more preferably 4.25 V (vs. $Li/Li^+$) or higher, still more preferably greater than 4.40 V (vs. $Li/Li^+$), particularly preferably 4.45 V (vs. $Li/Li^+$) or higher, most preferably 4.50 V (vs. $Li/Li^+$) or higher. The positive electrode potential (vs. $Li/Li^+$) in the fully charged state may be, however, 4.20 V or lower. The upper limit value of the positive electrode potential in the fully charged state is not particularly limited, but is preferably 6.00 V (vs. $Li/Li^+$) or lower, more preferably 5.00 V (vs. $Li/Li^+$) or lower, still more preferably 4.80 V (vs. $Li/Li^+$) or lower, particularly preferably 4.70 V (vs. $Li/Li^+$) or lower.

When the battery that has the above-described configuration is charged, for example, lithium ions are released from the positive electrode active material layer 21B, and through the electrolyte layer 24, occluded by the negative electrode active material layer 22B. In addition, when the battery is discharged, for example, lithium ions are released from the negative electrode active material layer 22B, and through the electrolyte layer 24, occluded by the positive electrode active material layer 21B.

Next, an example of a method for manufacturing the battery according to the first battery example of the present application will be described.

The positive electrode 21 is prepared as follows. First, for example, a positive electrode active material, a binder, and a conductive agent are mixed to prepare a positive electrode mixture, and this positive electrode mixture is dispersed in a solvent such as N-methyl-2-pyrrolidone (NMP) to prepare a paste-like positive electrode mixture slurry. Then, this positive electrode mixture slurry is applied to both surfaces of the positive electrode current collector 21A, the solvent is dried, and compression molding is performed with, for example, a roll press machine to form the positive electrode active material layer 21B, thereby providing the positive electrode 21.

The negative electrode 22 is prepared as follows. First, for example, a negative electrode active material and a binder are mixed to prepare a negative electrode mixture, and this negative electrode mixture is dispersed in a solvent such as N-methyl-2-pyrrolidone to prepare a paste-like negative electrode mixture slurry. Then, this negative electrode mixture slurry is applied to both surfaces of the negative electrode current collector 22A, the solvent is dried, and compression molding is performed with, for example, a roll press machine to form the negative electrode active material layer 22B, thereby providing the negative electrode 22.

The electrolyte layer 24 is formed as follows. First, for example, an electrolytic solution, a polymer compound as a holder that holds the electrolytic solution, a filler, and an organic solvent are mixed to provide a mixed solution. Next, the mixed solution is heated and stirred with the use of, for example, a homogenizer to dissolve the polymer compound and disperse the filler, thereby preparing a precursor solution in the form of a sol. Next, the precursor solution is uniformly applied onto both surfaces of the positive electrode 21 and negative electrode 22 to be impregnated with the solution. Thereafter, the diluting solvent is removed by vaporization to form the electrolyte layer 24.

The electrode body 20 is prepared as follows. First, the positive electrode lead 31 is attached by welding to the end of the positive electrode current collector 21A, and the negative electrode lead 32 is attached by welding to the end of the negative electrode current collector 22A. Then, the positive electrode 21 and negative electrode 22 with the electrolyte layer 24 formed are stacked with the separator 23 interposed therebetween to form a stacked body, and then, this stacked body is wound in the longitudinal direction, and the protective tape 25 is then bonded to the outermost periphery to obtain the electrode body 20.

The electrode body 20 is sealed by the exterior materials 10 as follows. First, for example, the electrode body 20 is sandwiched between the flexible exterior materials 10. In this regard, the close contact films 33A, 33B are inserted respectively between the exterior material 30 and the positive electrode lead 31 and between the exterior material 30 and the negative electrode lead 32. It is to be noted that the close contact films 33A, 33B may be attached in advance respectively to the positive electrode lead 31 and the negative electrode lead 32. In addition, the exterior material 10 may be embossed in advance to form a recess as a housing space for accommodating the electrode body 20. Next, outer edges of the exterior materials 10 are brought into close contact with each other by, for example, heat-sealing and then sealed. As described above, a battery is obtained in which the electrode body 20 is housed in the exterior material 10. After the sealing, the battery may be, for example, molded by heat pressing, if necessary.

In the second battery example, a battery including a separator including a filler will be described. It is to be noted that the battery according to the second battery example has the same configuration as the battery according to the first battery example, except that instead of the electrolyte layer 24, the separator includes the filler, only the configuration of the separator including the filler will be described below. As described later, the present application is applied to the filler.

Figure 4:
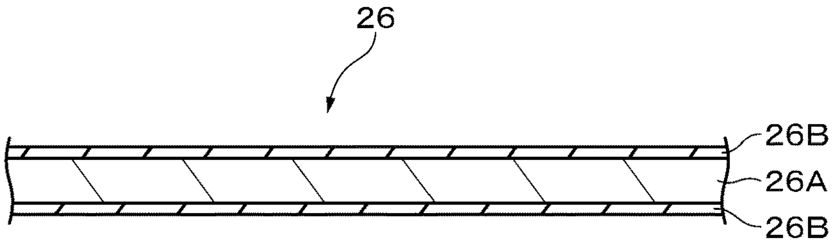
FIG. 4 is a sectional view illustrating an example of the configuration of a separator included in a non-aqueous electrolyte secondary battery according to a second battery example.

FIG. 4 shows an example of the configuration of a separator 26 including a filler. The separator 26 includes a substrate 26A and surface layers 26B provided on both surfaces of the substrate 26A. The separator 26 is impregnated with a part of the electrolyte constituting the electrolyte layer 24, with the filler and the electrolyte in contact with each other.

As the substrate 26A, the same as the separator 23 described above can be used. It is to be noted that the substrate 26A may include a filler.

The surface layer 26B includes: a filler; and a resin material that binds the filler to the surface of the substrate 26A and binds the fillers to each other. The filler is the same as the filler in the first battery example. This resin material may have a three-dimensional network structure that has, for example, a plurality of fibrils connected by fibrillation. In this case, the filler is supported on the resin material that has the three-dimensional network structure. In addition, the resin material may, without undergoing fibrillation, bind the surface of the substrate 26A to the filler, and bind the fillers to each other. In this case, higher binding properties can be obtained.

Examples of the resin material include high heat-resistance resins in which at least one of the melting point and the glass transition temperature is 180° C. or higher, for example, fluorine-containing resins such as a polyvinylidene fluoride and a polytetrafluoroethylene, fluorine-containing rubbers such as a vinylidene fluoride-tetrafluoroethylene copolymer and an ethylene-tetrafluoroethylene copolymer, rubbers such as a styrene-butadiene copolymer or a hydride thereof, an acrylonitrile-butadiene copolymer or a hydride thereof, an acrylonitrile-butadiene-styrene copolymer or a hydride thereof, a methacrylic acid ester-acrylic acid ester copolymer, a styrene-acrylic acid ester copolymer, an acrylonitrile-acrylic acid ester copolymer, an ethylene propylene rubber, a polyvinyl alcohol, and polyvinyl acetate, cellulose derivatives such as an ethyl cellulose, a methyl cellulose, a hydroxyethyl cellulose, and a carboxymethyl cellulose, a polyphenylene ether, a polysulfone, a polyether sulfone, a polyphenylene sulfide, a polyetherimide, a polyimide, polyamides such as a wholly aromatic polyamide (aramid), a polyamideimide, a polyacrylonitrile, a polyvinyl alcohol, a polyether, an acrylic resin, or a polyester. These resin materials may be used singly, or two or more thereof may be used in mixture. Among these materials, fluorine-based resins such as a polyvinylidene fluoride is preferred from the viewpoint of oxidation resistance and flexibility, and an aramid or a polyamideimide is preferred from the viewpoint of heat resistance.

The content of the filler in the surface layer 26B is preferably 20% by mass or more and 70% by mass or less. The content of the filler is 20% by mass or more, thereby particularly allowing the battery characteristics (for example, cycle characteristics) to be kept from undergoing deterioration, and allowing the battery to be kept from causing a defective appearance (for example, battery swelling). In contrast, the content of the filler is 70% by mass or less, thereby allowing the surface layer 26B to be kept from being detached in the winding step.

As the method for forming the surface layer, for example, a method can be used in which a slurry including a resin material, the solvent, and the filler is applied onto both substrates of the substrate 26A, allowed to pass through a poor solvent for the resin material and a good solvent bath of the solvent to cause phase separation, and then dried.

In the third battery example, a battery including an exterior material including a filler will be described. The battery according to the third battery example differs from the battery according to the first battery example in that the battery includes, instead of the electrolyte layer 24, an electrolytic solution as the electrolyte, and that instead of the electrolyte layer 24, an exterior material includes a filler. As described later, the present application is applied to the filler.

The electrolytic solution is the same as the electrolytic solution included in the electrolyte layer 24 in the first battery example.

Figure 5:
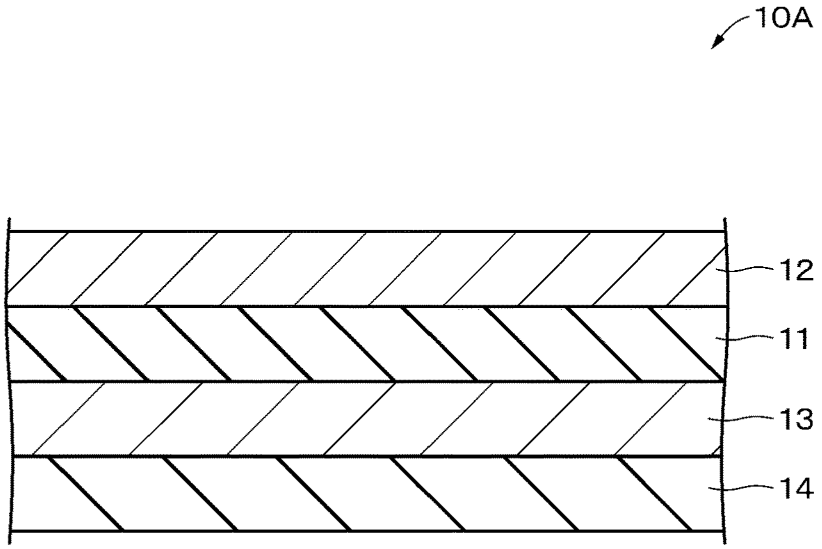
FIG. 5 is a sectional view illustrating an example of the configuration of an exterior material included in a non-aqueous electrolyte secondary battery according to a third battery example.

FIG. 5 shows an example of the configuration of an exterior material 10A including a filler. The exterior material 10A differs from the exterior material 10 in the first battery example in that the exterior material 10A includes a particle-containing layer 14 provided on a resin layer (second resin layer) 13. It is to be noted that in the third battery example, the same reference numerals are given to the same parts as those of the first battery example, and the description thereof will be omitted.

The particle-containing layer 14 is provided on a part of the surface of the resin layer 13 excluding a peripheral edge that is sealed by heat-sealing. The particle-containing layer 14 is preferably provided so as to cover the whole electrode body 20 from the viewpoint of improving the adsorption of generated gas, but may be provided so as to cover a part of the electrode body 20. For example, the particle-containing layer 14 may be provided so as to cover both end surfaces of the electrode body 20 or the peripheral surface of the electrode body 20.

The particle-containing layer 14 includes: a filler; and a resin material that binds the filler to the surface of the resin layer 13 and binds the fillers to each other. The filler is the same as the filler in the first battery example. The resin material is, for example, the same as the resin material included in the surface layer 26B in the second battery example. The particle-containing layer 14 preferably has the form of a gel. The electrolyte layer 24 has the form of a gel, thereby allowing liquid leakage from the battery to be prevented.

The content of the filler in the particle-containing layer 14 is 50% by mass or more and 90% by mass or less. The content of the filler is 50% by mass or more, thereby particularly allowing the battery characteristics (for example, cycle characteristics) to be kept from undergoing deterioration, and allowing the battery to be kept from causing a defective appearance (for example, battery swelling). In contrast, the content of the filler is 90% by mass or less, thereby allowing the particle-containing layer 14 to be kept from being detached in the sealing step.

The particle-containing layer 14 is prepared, for example, in the same manner as the surface layer 26B in the second battery example. The electrode body 20 is impregnated with the electrolytic solution, and the electrolytic solution is also provided between the exterior material 10A and the electrode body 20, with the filler included in the particle-containing layer 14 in contact with the electrolytic solution.

The present application, in an embodiment, relates to the fillers according to the first to third battery examples described above. Hereinafter, an example in which the present application is applied to the filler according to the first battery example will be described.

In general, in a non-aqueous electrolyte secondary battery, an electrolytic solution is used in an electrolyte. For example, organic molecules such as an ethylene carbonate (EC) are used as the electrolytic solution. When a battery is used to charge and discharge the battery repeatedly, the electrolytic solution such as EC is decomposed, and gases such as a carbon dioxide ($CO_2$), an ethylene gas, and a methane gas are then generated in the battery. When these gases are generated, the shape of the battery will be swollen and deformed in the case of a laminate-type battery. Because the laminate-type battery is mounted in a narrow space of a thin device such as a smartphone or a tablet terminal, the swelling of the battery may open a cover for the housing of the smartphone or tablet terminal, and depending on the usage condition of a user, will make the internal electronic components likely to be exposed to water. More specifically, the swelling of the battery may cause not only deterioration in appearance, but also a device failure.

Thus, there is a technique of mixing a zeolite as a filler into an electrolyte for adsorbing gas generated in a battery. The zeolite is, for example, a particulate inorganic oxide composed of Si, Al, and the like, and the surface of the zeolite has pores formed. Molecules that are smaller than the pore diameter (pore size) of the zeolite can enter the interior of the zeolite, and may be adsorbed within the zeolite. When the pore size is large, the zeolite may adsorb not only molecules of the gas generated in the battery but also molecules of the electrolytic solution, and it is necessary to adjust the pore size of the zeolite appropriately.

Now, some moisture ($H_2O$) is mixed in an electrolytic solution such as EC, and a slight amount of moisture may be mixed if a dehydration step is added in the EC preparation process. It is common to dissolve, as an electrolyte salt, a lithium hexafluorophosphate ($LiPF_6$) in EC (for example, the concentration of $LiPF_6$ is 1 mol/l), but in this case, the $LiPF_6$ may chemically react with $H_2O$ in the EC, thereby generating hydrogen fluoride (HF) (chemical reaction 1). If a zeolite containing Si is used as a filler for adsorption of the gas generated in the battery, this HF will chemically react with Si in the zeolite, thereby destroying the zeolite containing Si and generate $H_2O$ (chemical reaction 2). This generated $H_2O$ will chemically react with the remaining $LiPF_6$, thereby generating HF (chemical reaction 1). As described above, the chemical reaction 1 and the chemical reaction 2 will be repeated, and the zeolite containing Si may be gradually destroyed.

Thus, in the present application, the use of a zeolite containing no Si as the filler avoids a chemical reaction by which the zeolite is broken as described above, thereby sufficiently adsorbing gas generated in the battery, and preventing the shape of the battery from being swollen. The filler is an AlPO-type zeolite (aluminophosphate-type zeolite) as described in Examples 1 to 3 below. The aluminophosphate-type zeolite contains constituent elements such as Al, P, and O, and contains no Si. Hereinafter, a method for preparing the battery will be described.

The positive electrode was prepared as follows. First, 90% by weight of the positive electrode active material mixed, 5 wt % of amorphous carbon powder (Ketjen black), and 5 wt % of a polyvinylidene fluoride (PVdF) were mixed to prepare a positive electrode mixture. The positive electrode mixture was dispersed in N-methyl-2 pyrrolidone (NMP) to prepare a positive electrode mixture slurry, and then, this positive electrode mixture slurry was uniformly applied to both surfaces of a band-shaped aluminum foil (positive electrode current collector) to form coating films. Next, the coating films were dried with hot air, and then subjected to compression molding (roll temperature: 130° C., linear pressure: 0.7 t/cm, pressing speed: 10 m/min) with a roll press machine to form a positive electrode sheet. Next, this positive electrode sheet was cut into a band shape of 48 mm×300 mm to prepare a positive electrode. Next, a positive electrode lead was attached to an exposed part of the positive electrode current collector of the positive electrode.

The negative electrode was prepared as follows. First, graphite particles as a negative electrode active material and an NMP solution containing 20% by weight of a polyimide binder were mixed at a ratio by weight of 9:1 to prepare a negative electrode mixture slurry. Next, the negative electrode mixture slurry was applied to both surfaces of a copper foil (negative electrode current collector) of 15 μm in thickness with the use of a bar coater with a gap of 35 μm to form coating films, and the coating films were dried at 80° C. Next, the coating films were subjected to compression molding with a roll press machine, and then heated at 700° C. for 3 hours to form a negative electrode sheet. This negative electrode sheet was cut into a band shape of 50 mm×310 mm to prepare a negative electrode. Next, a negative electrode lead was attached to an exposed part of the negative electrode current collector of the negative electrode.

The prepared positive electrode and negative electrode were brought into close contact with each other, with a separator composed of a microporous polyethylene film of 25 μm in thickness interposed between the electrodes, and wound in the longitudinal direction, and a protective tape was attached to the outermost periphery, thereby preparing a wound electrode body in a flattened shape. Next, the wound electrode body was loaded between exterior members, and three sides of the exterior members were subjected to heat-sealing, whereas the remaining side was not subjected to heat fusion to provide an opening. Moisture-proof aluminum laminate films with a 25 μm thick nylon film, 40 μm thick aluminum foil, and a 30 μm thick polypropylene film laminated in order from the outermost layer were used as the exterior members.

A mixed solvent was prepared by mixing an ethylene carbonate (EC) and an ethyl methyl carbonate (EMC) so as to meet EC:EMC=1:1 in ratio by mass. Next, in this mixed solvent, a lithium hexafluorophosphate ($LiPF_6$) was dissolved as an electrolyte salt so as to reach 1 mol/l, thereby preparing an electrolytic solution. Into this electrolytic solution, the filler shown in Table 1 below was mixed so as to reach a concentration of 2 wt %, thereby preparing a filler-containing electrolytic solution. The electrolytic solution was injected from the opening of the exterior members, and the remaining side of the exterior members was subjected to heat-sealing under reduced pressure and sealed. Thus, a target non-aqueous electrolyte secondary battery was obtained.

EXAMPLES

Hereinafter, the present application will be described with reference to examples according to an embodiment, but the present application is not to be considered limited to only the examples.

Example 1

In the step of preparing the electrolytic solution, the type of the filler was an AlPO-type zeolite (AlPO-18, structure code: AEI). The ratio of Si/Al (atomic ratio) of the filler was considered as 0. The pore size of the filler was considered as 3.8 Å. It is to be noted that the code specified by "International Zeolite Association (IZA)" is used as the structure code of the zeolite.

Example 2

In the step of preparing the electrolytic solution, the type of the filler was an AlPO-type zeolite (AlPO-5, structure code: AFI), and the ratio of Si/Al (atomic ratio) of the filler was considered as 0. The pore size of the filler was considered as 5.4 Å.

Example 3

In the step of preparing the electrolytic solution, the type of the filler was an AlPO-type zeolite (AlPO-31, structure code: ATO), and the ratio of Si/Al (atomic ratio) of the filler was considered as 0. The pore size of the filler was considered as 7.3 Å.

Comparative Example 1

In the step of preparing the electrolytic solution, no filler was mixed into the electrolytic solution. No filler was used.

Comparative Example 2

In the step of preparing the electrolytic solution, the type of the filler was alumina. The ratio of Si/Al was considered as 0. The alumina was considered having no pores, and the pore size of the filler was considered as 0 Å.

Comparative Example 3

In the step of preparing an electrolytic solution, the type of the filler was a 4A-type zeolite (structure code: LTA). The 4A-type zeolite is a zeolite containing Si and Al as chemical symbols, and the ratio of Si/Al (atomic ratio) of the filler was considered as 1. The pore size of the filler was considered as 4.0 Å.

Comparative Example 4

In the step of preparing an electrolytic solution, the type of the filler was a ZSM-5 type zeolite (structure code: MFI). The ZSM-5 type zeolite was a zeolite containing Si and Al, and the ratio of Si/Al (atomic ratio) of the filler was considered as 1500. The pore size of the filler was considered as 5.8 Å.

Comparative Example 5

In the step of preparing an electrolytic solution, the type of the filler was a 13X-type zeolite (structure code: FAU). The 13X-type zeolite was a zeolite containing Si and Al, and the ratio of Si/Al (atomic ratio) of the filler was considered as 1.23. The pore size of the filler was considered as 10 Å.

(Evaluation of Capacity Retention Ratio)

First, the battery was subjected to constant current charge at a charge current of 0.5 A, and then, to constant voltage charge until the current value was reduced to 1/10. Thereafter, the discharge capacity at a discharge current of 0.2 A was measured. The value of the discharge current for 1C was calculated from the discharge capacity thus obtained. Next, the battery was charged at 23° C. under the above-described charge conditions, and in a thermostatic bath under an environment at 45° C., and then discharged under the same environment at a discharge current of 0.5C and a cutoff voltage of 3.0 V. Under the charge-discharge conditions, the battery was subjected to 300 cycles of charge-discharge, and the capacity retention ratio in that case was calculated. The capacity retention ratio was considered as the ratio of the capacity obtained from the 300-th cycle of charge-discharge to the capacity obtained from the first charge-discharge.

(Evaluation of Battery Swelling)

The thickness of the battery was measured after the 300 cycles, and in the case of the thickness increased by 3% or more from the cell thickness after the initial charge, the battery swelling was determined to be "present", or in the case of the thickness increased by less than 3% from the cell thickness after the initial charge, the battery swelling was determined to be "absent".

The results are shown in Table 1 below.

TABLE 1

| | | | | | Charge-Discharge Cycle at Room Temperature (23° C.) | | Charge-Discharge Cycle at 45° C. |
|---|---|---|---|---|---|---|---|
| | Type of Filler | Structure Code of Zeolite | Ratio of Si/Al (Atomic Ratio) | Pore Size of Filler (Å) | Capacity Retention Ratio (%) | Battery Swelling | Capacity Retention Ratio (%) |
| Example 1 | AlPO-type Zeolite (AlPO-18) | AEI | 0 | 3.8 | 90 | Absent | 77 |
| Example 2 | AlPO-type Zeolite (AlPO-5) | AFI | 0 | 5.4 | 88 | Absent | 75 |

TABLE 1-continued

| | Type of Filler | Structure Code of Zeolite | Ratio of Si/Al (Atomic Ratio) | Pore Size of Filler (Å) | Charge-Discharge Cycle at Room Temperature (23° C.) Capacity Retention Ratio (%) | Charge-Discharge Cycle at Room Temperature (23° C.) Battery Swelling | Charge-Discharge Cycle at 45° C. Capacity Retention Ratio (%) |
|---|---|---|---|---|---|---|---|
| Example 3 | AlPO-type Zeolite (AlPO-31) | ATO | 0 | 7.3 | 88 | Present | 75 |
| Comparative Example 1 | No | — | — | — | 83 | Present | 68 |
| Comparative Example 2 | Alumina | — | 0 | 0 | 83 | Present | 68 |
| Comparative Example 3 | 4A-type Zeolite | LTA | 1 | 4.0 | 89 | Absent | 62 |
| Comparative Example 4 | ZSM-5 type Zeolite | MFI | 1500 | 5.8 | 84 | Absent | 43 |
| Comparative Example 5 | 13X-type Zeolite | FAU | 1.23 | 10.0 | 85 | Present | 59 |

The capacity retention ratio was relatively high in the charge-discharge cycles at room temperature (23° C.) and 45° C. in Examples 1 to 3 (AlPO-type zeolite), whereas the capacity retention ratio was relatively low in the charge-discharge cycle at room temperature of 23° C. in some of Comparative Examples 1 to 5, and the capacity retention ratio was relatively low in the charge-discharge cycle at 45° C. in all of the examples. In Examples 1 to 3, because of including the zeolites containing no Si, the zeolites are believed to have not been decomposed so much by HF generated in the battery, thereby causing the zeolites to function sufficiently, and resulting in the relatively high capacity retention ratios. In Comparative Examples 1 and 2, because of having no zeolite, the capacity retention ratios are believed to have been relatively low. In Comparative Examples 3 to 5, because of including the zeolites containing Si, the zeolites are believed to have been decomposed in relatively large amounts by HF generated in the battery, thereby causing the zeolites to fail to function sufficiently, and resulting in the relatively low capacity retention ratios. From Table 1, it can be determined that when the filler includes the zeolite containing no Si as a constituent element (aluminophosphate-type zeolite), the battery has a high capacity retention ratio if the battery is repeatedly charged and discharged.

In particular, of Examples 1 to 3, the battery was not swollen in the charge-discharge cycle at 23° C. in Example 1 (the pore size of the filler was 3.8 Å) and Example 2 (the pore size of the filler was 5.4 Å), whereas the battery was swollen in Example 3. In Examples 1 and 2, the zeolites are believed to have sufficiently adsorbed the gas generated in charge-discharge, and in Example 3, the pore size of the zeolite was so excessively large that the molecules (for example, EC) of the electrolytic solution entered the zeolite and adsorbed onto the zeolite, thus causing the zeolite to fail to sufficiently adsorb the gas generated. From Table 1, it can be determined that when the filler includes zeolite containing no Si as a constituent element (aluminophosphate-type zeolite), with the filler being 3.8 Å or more and 5.4 Å or less in pore size, the battery has a high capacity retention ratio, with shape welling successfully suppressed to be equal to or less than a certain level, if the battery is repeatedly charged and discharged.

While an embodiment of the present application has been described herein, the contents of the present application are not to be considered limited thereto, and various modifications thereof can be made.

While the electrode body 20 is a wound electrode body that has a flattened shape according to the first to third battery examples and the embodiment, the electrode body 20 may be a stacked electrode body that has a structure where a positive electrode and a negative electrode alternately stacked with a separator interposed therebetween.

While an example of the laminate-type battery including the electrolyte layer 24 including the filler, an example of the laminate-type battery including the separator including the filler, and an example of the laminate-type battery including the exterior material including the filler have been separately described respectively in the first to third battery examples, these examples may be combined, and at least one of the electrolyte, the separator, or the exterior material may include the filler.

While a case where the battery includes, as an electrolyte, the electrolyte layer 24 including the electrolytic solution, the polymer compound, and the filler has been described in the first battery example, the battery includes, as an electrolyte, an electrolytic solution including a filler. In this case as well, an effect that is similar to that of the first battery example can be obtained.

While a case where the electrolyte layer 24 includes the filler has been described in the first battery example, at least one of the positive electrode 21 and the negative electrode 22 may include the filler. In this case as well, an effect that is similar to that of the first battery example can be obtained.

The content of the filler in the positive electrode 21 and the negative electrode 22 is preferably 0.1% by mass or more and 1% by mass or less. The content of the filler is 0.1% by mass or more, thereby particularly allowing the battery characteristics (for example, cycle characteristics) to be kept from undergoing deterioration, and allowing the battery to be kept from causing a defective appearance (for example, battery swelling). In contrast, the content of the filler is 1% by mas or less, thereby allowing the battery capacitance to be kept from being decreased.

While a case where the electrolyte layer 24 provided between the positive electrode 21 and the separator 23 and the electrolyte layer 24 provided between the negative electrode 22 and the separator 23 both include the filler has been described in the first battery example, one of these electrolyte layers 24 may include the filler.

While a case where the precursor solution is applied to both surfaces of the positive electrode 21 and negative electrode 22 to form the electrolyte layers 24 has been described in the first battery example, the precursor solution may be applied to both surfaces of the separator 23 to form the electrolyte layers 24.

While a case where the separator 26 includes the surface layers 26B including the filler on both surfaces of the substrate 26A has been described in the second battery example, the separator 26 may include the surface layer 26B including the filler on one surface of the substrate 26A.

When the separator 26 includes the surface layer 26B on one surface of the substrate 26A, the separator 26 preferably includes the surface layer 26B on one of both surfaces of the substrate 26A on the side facing the positive electrode 21. In this case, the oxidation resistance (stability against the positive electrode 21 at a higher potential) of the surface facing the positive electrode 21, of both surfaces of the separator 26 can be improved.

While a case where the separator 26 has a laminated structure that includes: the substrate 26A; and the surface layers 26B including the filler has been described in the second battery example, the separator 26 may have a single-layer structure composed of a substrate including a filler.

The separator 23 may be longer than the positive electrode 21 and the negative electrode 22 outside the outer periphery of the electrode body 20 such that the separator 23 covers the outer periphery of the electrode body 20. In this case, the generated gas discharged from the electrode body 20 can be absorbed by the separator covering the outer periphery of the electrode body 20. From the viewpoint of improving the absorbability of the generated gas, the separator 23 is preferably wound one or more turns longer than the electrode located on the more outer peripheral side, of the positive electrode 21 and the negative electrode 22.

While a case where the exterior material 10A includes the particle-containing layer 14 on the resin layer 13 has been described in the third battery example, the resin layer 13 including the filler may be included instead of including the particle-containing layer 14. In this case, a part of the filler is preferably exposed from the surface of the resin layer 13. Such a configuration is employed, thereby allowing the absorption of the generated gas to be improved.

Figure 6:
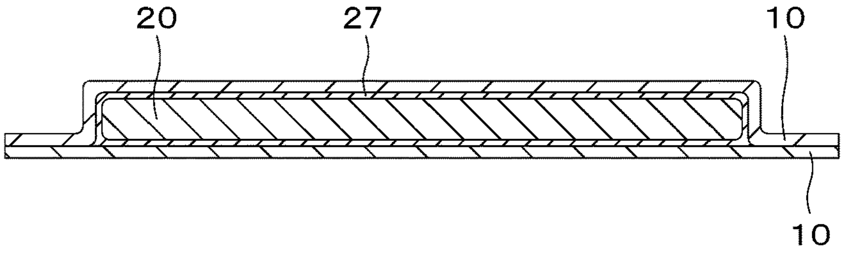
FIG. 6 is a sectional view showing an example of the configuration of a non-aqueous electrolyte secondary battery according to a modification example.

While a case where the exterior material 10A includes the filler has been described in the third battery example, the battery may include a particle-containing layer 27 between the exterior material 10A and the electrode body 20 as shown in FIG. 6. The particle-containing layer 27 is, for example, the electrolyte layer 24 according to the first battery example, or a sheet including a filler. From the viewpoint of improving the absorption of the generated gas, the sheet including the filler preferably has a configuration that allows the permeation of the electrolytic solution. In addition, the battery may include an electrolytic solution including a filler between the exterior material 10A and the electrode body 20.

Although the battery has been described herein according to an embodiment including with reference to examples and modifications thereof, the present application is not to be considered limited thereto, and various modifications thereof can be made.

For example, the configurations, methods, processes, shapes, materials, numerical values, and the like mentioned in the above-described battery examples, embodiment and modification example are merely examples, and different configurations, methods, processes, shapes, materials, numerical values and the like from these may be used as necessary. The chemical formulas of compounds and the like are representative ones, and the valences and the like are not limited to the described ones as long as the names are common names of the same compounds.

In addition, the configurations, methods, steps, shapes, materials, numerical values, and the like according to the battery examples, the embodiment, and the modification example described above can be combined with each other.

In addition, in the numerical range described stepwise in the present specification, the upper limit value or lower limit value of the numerical range of one step may be replaced with the upper limit value or lower limit value of the numerical range of another step. In addition, unless otherwise stated, one of the materials exemplified in the present specification may be used singly, or two or more thereof may be used in combination.

DESCRIPTION OF REFERENCE SYMBOLS

10, 10A: Exterior material
14, 27: Particle-containing layer
20: Electrode body
21: Positive electrode
21A: Positive electrode current collector
21B: Positive electrode active material layer
22: Negative electrode
22A: Negative electrode current collector
22B: Negative electrode active material layer
23, 26: Separator
24: Electrolyte layer
25: Protective tape
26A: Substrate
26B: Surface layer
31: Positive electrode lead
32: Negative electrode lead
33A, 33B: Close contact film It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:
an electrode body including a positive electrode and a negative electrode stacked with a separator provided therebetween;
an electrolyte layer provided between the positive electrode and the separator and between the negative electrode and the separator; and
an exterior material,
wherein the separator is an insulating porous membrane,
wherein the electrolyte layer includes a filler,
wherein the filler includes a zeolite having no Si as a constituent element, and
wherein a concentration of the filler in the electrolyte layer provided between the positive electrode and the separator is higher than a concentration of the filler in the electrolyte layer provided between the negative electrode and the separator.

2. The battery according to claim 1, wherein the zeolite includes an aluminophosphate-type zeolite.

3. The battery according to claim 2, wherein the aluminophosphate-type zeolite is 3.8 Å to 5.4 Å-in pore size.

4. The battery according to claim 1,
wherein the zeolite includes an aluminophosphate-type zeolite, and
wherein the aluminophosphate-type zeolite is 3.8 Å to 5.4 Å in pore size.

5. The battery according to claim 1,
wherein the filler is further included in the exterior material.

6. The battery according to claim 5,
wherein the electrolyte layer includes an electrolytic solution.

* * * * *